United States Patent [19]
Smith, III et al.

[11] Patent Number: 5,394,168
[45] Date of Patent: Feb. 28, 1995

[54] DUAL-MODE HAND-HELD GAME CONTROLLER

[75] Inventors: Jay Smith, III, Los Angeles; Kenneth J. Curran, Thousand Oaks, both of Calif.

[73] Assignee: Smith Engineering, Culver City, Calif.

[21] Appl. No.: 1,057

[22] Filed: Jan. 6, 1993

[51] Int. Cl.[6] .................................. G09G 3/02
[52] U.S. Cl. ............................ 345/156; 345/158
[58] Field of Search .............. 340/707, 706, 709; 273/148 B; 345/158, 156, 157, 161, 163, 166, 167, 168, 179, 180

[56] References Cited

U.S. PATENT DOCUMENTS

| | | | |
|---|---|---|---|
| 4,591,841 | 5/1986 | Gunderson et al. | 345/180 |
| 4,748,441 | 5/1988 | Brzezinski | 345/161 |
| 4,844,476 | 7/1989 | Becker | 340/156 |
| 5,046,739 | 9/1991 | Reichow | 273/148 B |
| 5,059,958 | 10/1991 | Jacobs et al. | 340/156 |

*Primary Examiner*—Alvin E. Oberley
*Assistant Examiner*—Vivian W. Chang
*Attorney, Agent, or Firm*—Price, Gess & Ubell

[57] ABSTRACT

A hand-held controller for an electronic gaming system wherein each of one or more players can control two gaming objects at the same time. A joystick-like thumb operated directional switch, mounted in a housing, is used to select or control the movement of a primary object and an optical detection/pointing system, carried in the same housing, is used to select or control the movement a secondary object.

4 Claims, 9 Drawing Sheets

FIG. 9b ately simple. For example, one of the early games consisted
DUAL-MODE HAND-HELD GAME CONTROLLER

BACKGROUND OF THE INVENTION a. Field of the Invention

The present invention relates to electronic gaming systems, more specifically, to hand held controllers or control pads used with a microprocessor controlled gaming system and an associated raster scanned display or television.

b. Related Art

Computer gaming systems first arrived and gained wide spread popularity around the early 1980's. The initial games available for home use were relatively simple. For example, one of the early games consisted of two electronic paddles on either side of a screen and an electronic ball which two players bounced back and forth to one another in a tennis-like fashion. The input devices used with these early games were correspondingly simple, i.e. joysticks or rotary dials.

The Genesis System, manufactured by Sega Enterprises Ltd., is one of the most commercially successful gaming systems of modern times. As suggested by FIG. 1, the Genesis System is based around a microprocessor controlled Gaming Device 10 which is connected to a raster scanned display (i.e. a standard television). The gaming device 10 accepts a game cartridge and has electronic plug inputs 12, 13 for communication with two hand held Control Pads. A conventional control pad 30 is depicted in FIG. 2. The game cartridge contains the appropriate firmware which, in connection with the gaming device 10, processes player commands from the control pads 30 and to display the changing action of a particular game on the television. A detailed explanation of the gaming device 10 is not necessary for an understanding of the present invention which is directed to an enhanced control pad.

FIG. 2 illustrates the exterior of a conventional Control Pad 30 currently available with the Genesis System. As shown, the conventional Control Pad 30 is comprised of a joystick-like directional button 32 (D-Button) on its left side and a plurality of control buttons (A,B,C, and Start) on its right side. The user generally operates the Control Pad 30 by holding it in both hands so that the left thumb is positioned over the D-Button and so that the right thumb is positioned over the A,B,C, and Start buttons.

We'll use a hypothetical basketball game to explain the use of the conventional Control Pad 30. Passing the ball from player to player is a desirable feature in such a game. Given a conventional control pad 30, the user might use the D-Button to direct the movement of the player with the ball and simultaneously press the A Button to consecutively select one of the other four players to receive the pass. The user might then pass the ball to the selected player by pressing the C Button. While this may be a complicated process for some people, many children and certain game playing adults are capable of relatively high levels of hand/eye coordination. The conventional control pad 30 was a significant step in addressing the needs of such gifted players. However, returning to our specific basketball example, note that the player cannot use the conventional control pad 30 to immediately select a particular player to receive the pass. As shown by this one example, there is still room for improvement in gaming systems and, more specifically, for enhanced control capability and greater complexity.

SUMMARY OF THE INVENTION

The present invention resolve the above-noted shortcomings with existing control pads and addresses the never ending consumer demand for games of progressively greater complexity.

A preferred embodiment of a hand held control pad according to the present invention incorporates a joystick-like input and an optical pointer. The user operates the joystick-like input to control one object and simultaneously point at the screen to control or select another object. For the first time, a user can simultaneously control two independent objects with ease.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

The just-summarized invention will now be described in detail in conjunction with the drawings of which:

FIGS. 3b, 3c, and 3d are respectively a top plan view, a front elevational view and a side elevational view of the preferred dual mode hand held controller 100 of FIG. 3a;

DETAILED DESCRIPTION OF THE PREFERRED EMBODIMENT

The following description is provided to enable any person skilled in the field of electronic games to make and use the invention and sets forth the best modes contemplated by the inventors of carrying out their invention. Various modifications, however, will remain readily apparent to those skilled in these arts, since the generic principles of the present invention have been defined herein specifically to provide an enhanced dual-mode hand-held controller for electronic games.

FIGS. 3a–3d depict a preferred dual-mode hand-held controller 100 according to the present invention. As shown, the dual-mode controller 100 retains the control buttons associated with a convention controller 30 shown in FIG. 2: i.e. a D-Switch (joystick) and the A, B, C, and Start Buttons. However, in addition to these conventional buttons, the dual-mode controller 100 of the present invention incorporates an optical detection system 370 which allows the controller to be simultaneously used like a joystick and like an optical pointer. The dual-mode controller 100 allows each user to simultaneously control two independently movable objects.

The optical detection system of the dual-mode controller 100 includes a lens system 370 (see FIG. 7) comprised of one or more lenses which, in the preferred embodiment, is comprised of a pair of fresnel lenses 120, 122. The outermost lens 120 is visible in FIG. 3c and the relationship between the two lenses and an external PCB and a phototransistor 322 is shown in FIGS. 8a and 8b. Two fresnel lenses were used as shown in order to obtain a shorter focal length.

Figure 4:
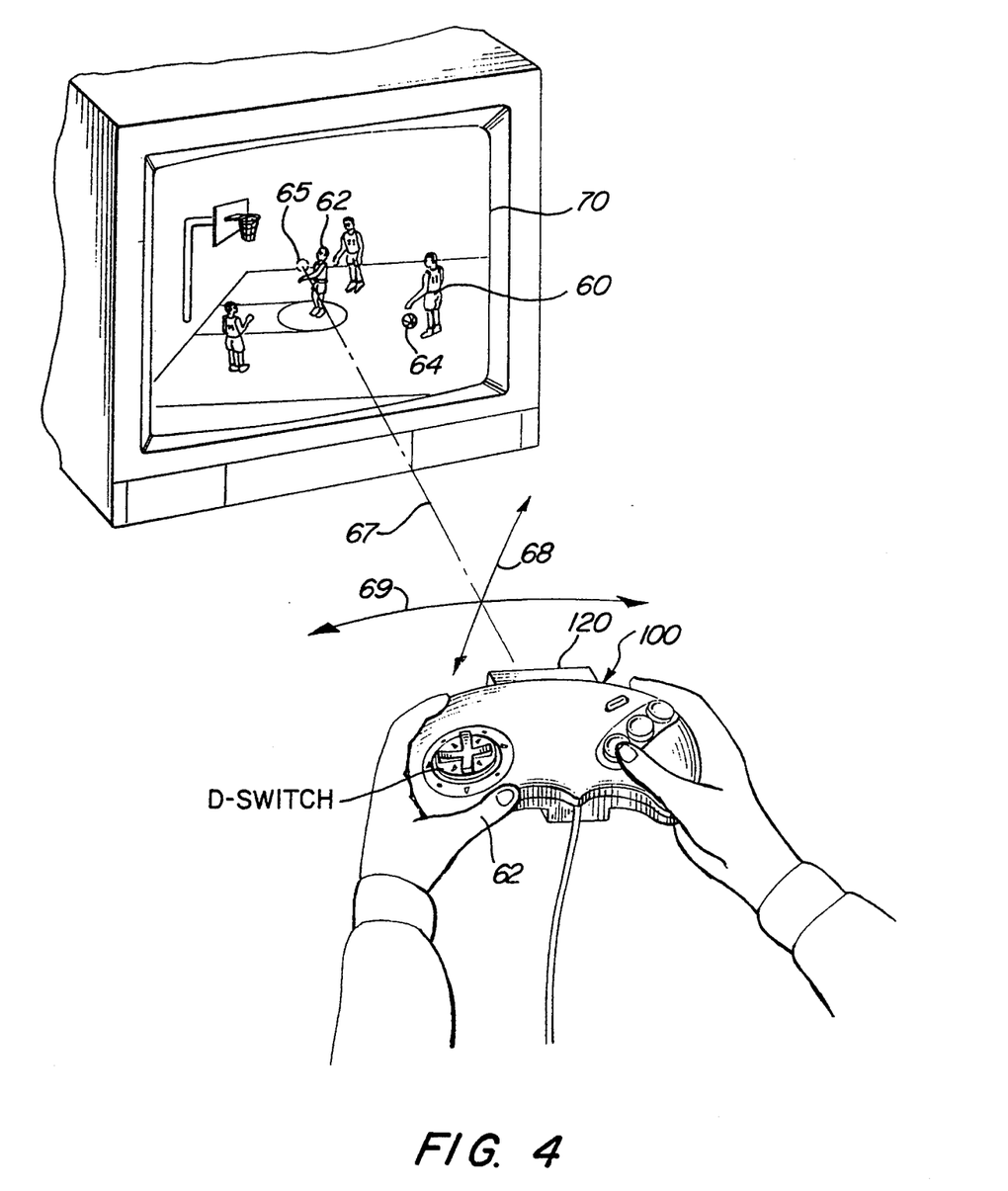
FIG. 4 is a perspective view of the preferred dual mode hand held controller 100 as used with a hypothetical basketball game wherein the user is moving a first player 60 (the one dribbling the ball) with the left thumb while simultaneously selecting another player 62 (the one to receive a pass from the first player) by pointing at that player.

As shown in FIG. 4, the dual-mode hand-held controller 100 is, like the conventional controller 30, intended two be held in the player's two hands. However, the dual-mode controller 100 offers a significant advantage over the conventional controller 30 in that the dual-mode controller 100 allows each of one or more players to control two game objects at the same time.

We will return to the hypothetical basketball game and the ball passing example that we discussed above to illustrate the advantages of this new controller. Referring to FIG. 4, we see that the player's left thumb 62 is operating the D-Switch to control the movement of the basketball player 60 that is dribbling the ball 64. At the same time, the player can move the entire controller 100 in any desired direction, as suggested by solid lines 68, 69, and aim the controller at a particular player, as suggested by dashed line 67 and as optionally shown by a display cursor 65, in order to select and then pass the ball 64 to that other basketball player, in this case player 62. Preferably, a symbol such as symbol 65 appears on the screen 70 to provide the player with a visual feedback as to where the controller 100 is pointing.

Figure 5:
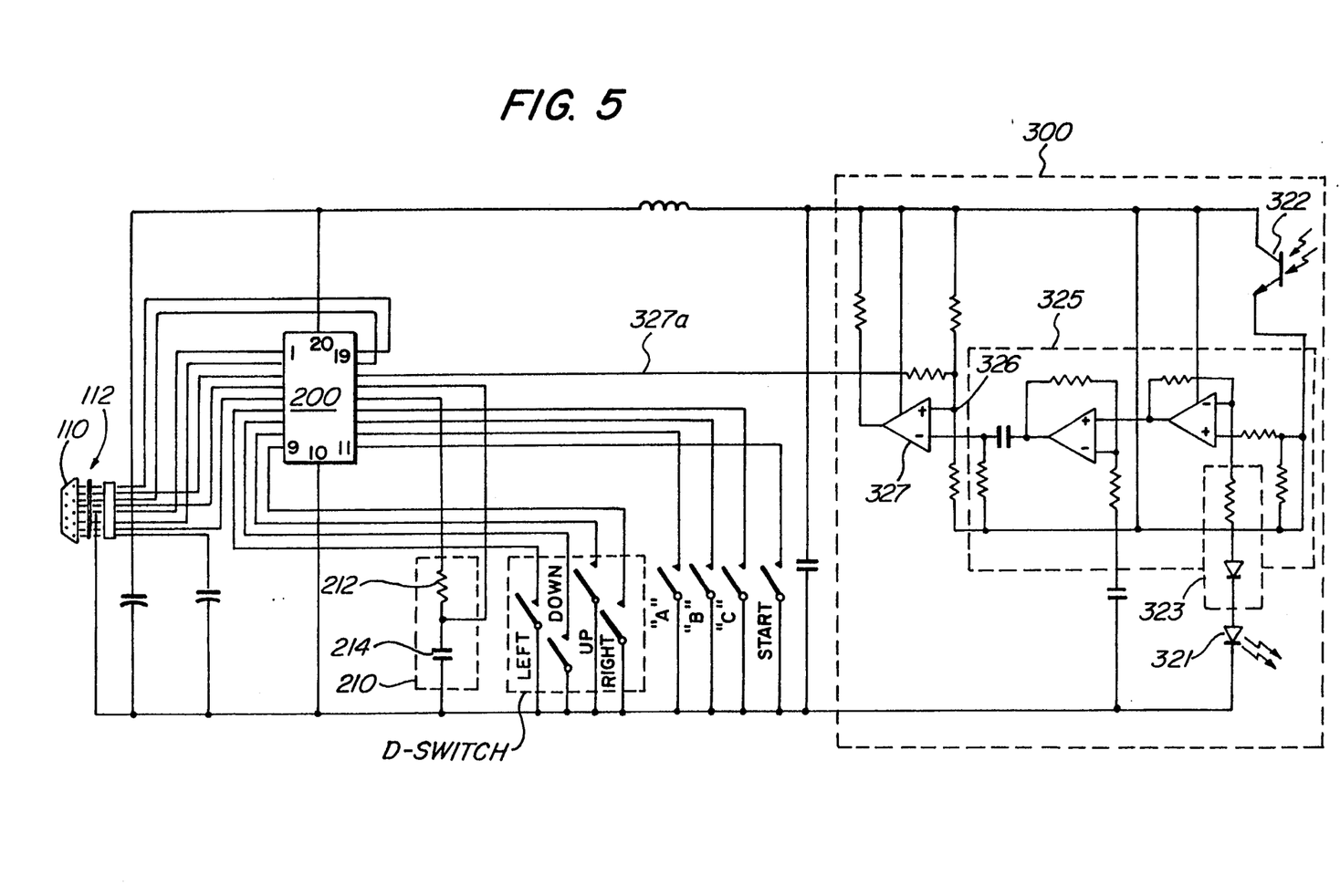
FIG. 5 is a schematic diagram of the circuitry used in the preferred dual mode hand held controller 100 of FIG. 4, which circuitry is based around an Application Specific Integrated Circuit ("ASIC") 200.
Figure 6:
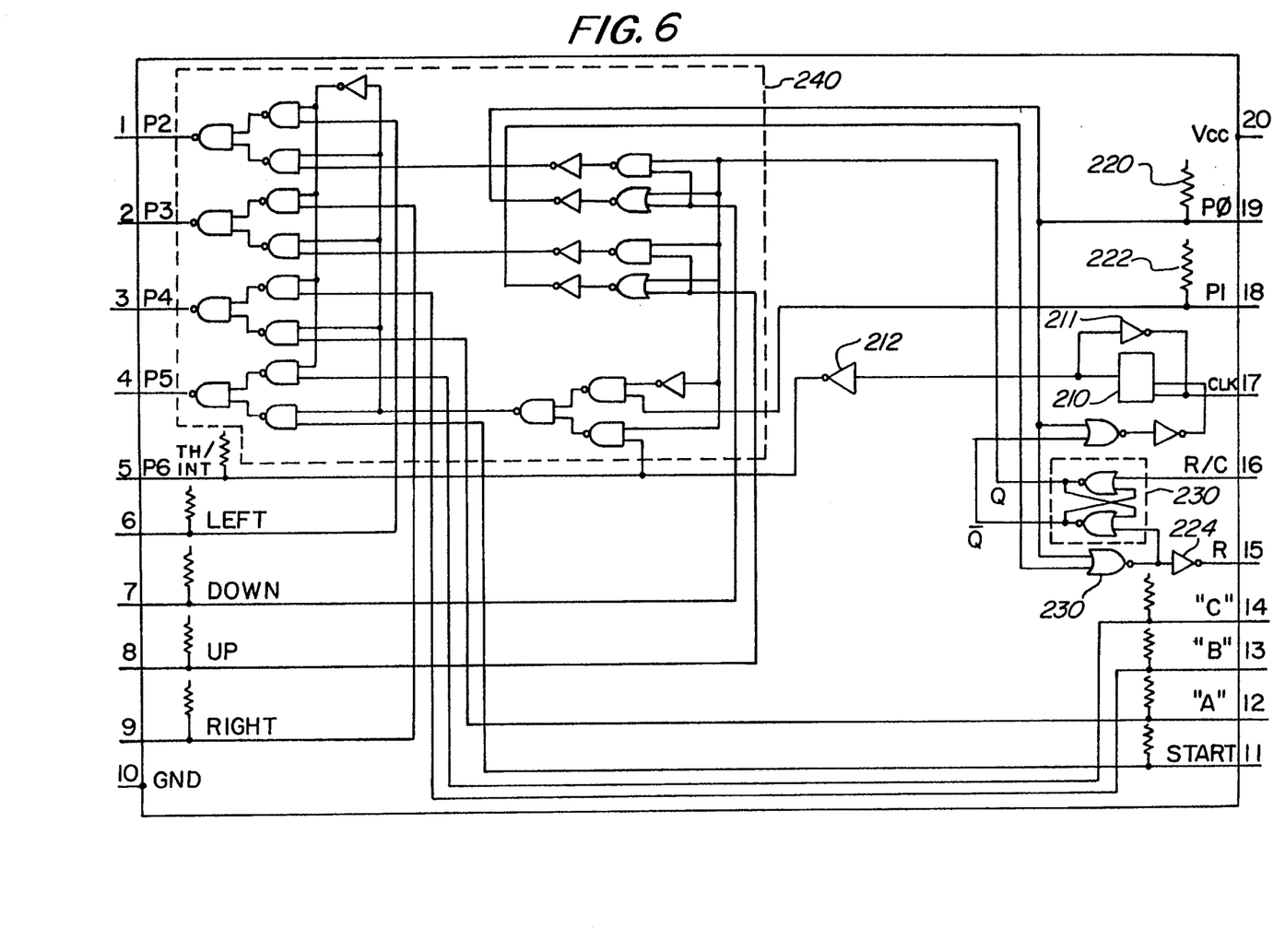
FIG. 6 is a schematic diagram of the communication and control logic implemented within the ASIC 200 of FIG. 5.

The just described passing procedure for a basketball game is just an example. The dual-mode hand-held controller 100 could be used with numerous other games. In addition, two controllers can be used at the same time by two different players such that each can control two objects at the same time. This is a particularly important advantage with respect to two players games that simulate competitive sports. The following list of possible games and associated functions is just the tip of the iceberg:

Football
  Point at receiver to determine where to throw pass
  Point to active player to control receiver route
  Point in front of a runner as a directional guide
  Control blockers by pointing, runner with D-Switch
Basketball
  Point at the player to pass to
  Move another player in position to set a pick
  Human accuracy (quickly place cursor on basket before shot)
Baseball
  Select the base to throw to
  Control base runner
  Bat by pointing at pitch location
Tennis
  Move both players on your side in a doubles match
Hockey
  Control passing by identifying the player to pass to
  Control player away from puck for blocking
Shooting
  Control where the shot is aimed
  Select targets independently of hero or vehicle direction
  Hit menu choices at any time FIGS. 5 and 6 illustrate a preferred circuity for implementing a dual mode hand held controller 100 according to the present invention. FIG. 5 is a view of the "forest", including an ASIC 200 shown in block diagram form and FIG. 6 is a view of the "trees" within the ASIC 200.

Figure 1:
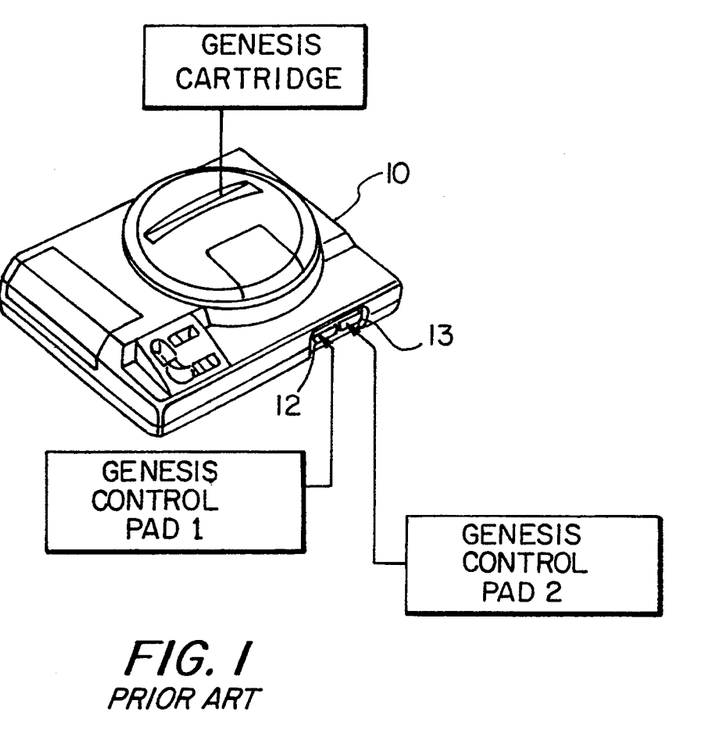
FIG. 1 is a perspective illustration of a conventional gaming device 10 which is a basic unit in a gaming system known as the Genesis System.
Figure 2:
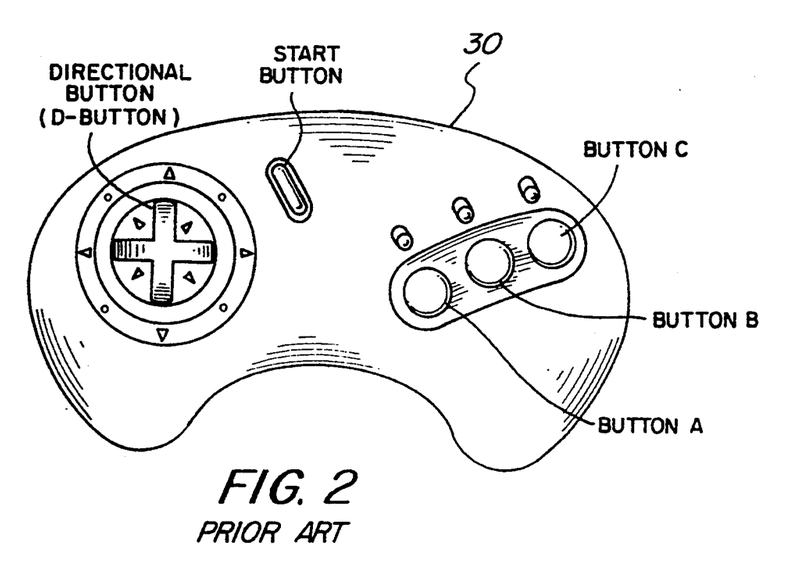
FIG. 2 is a top plan view of a conventional control pad 30 used with the conventional gaming device of FIG. 1.
Figure 3A:
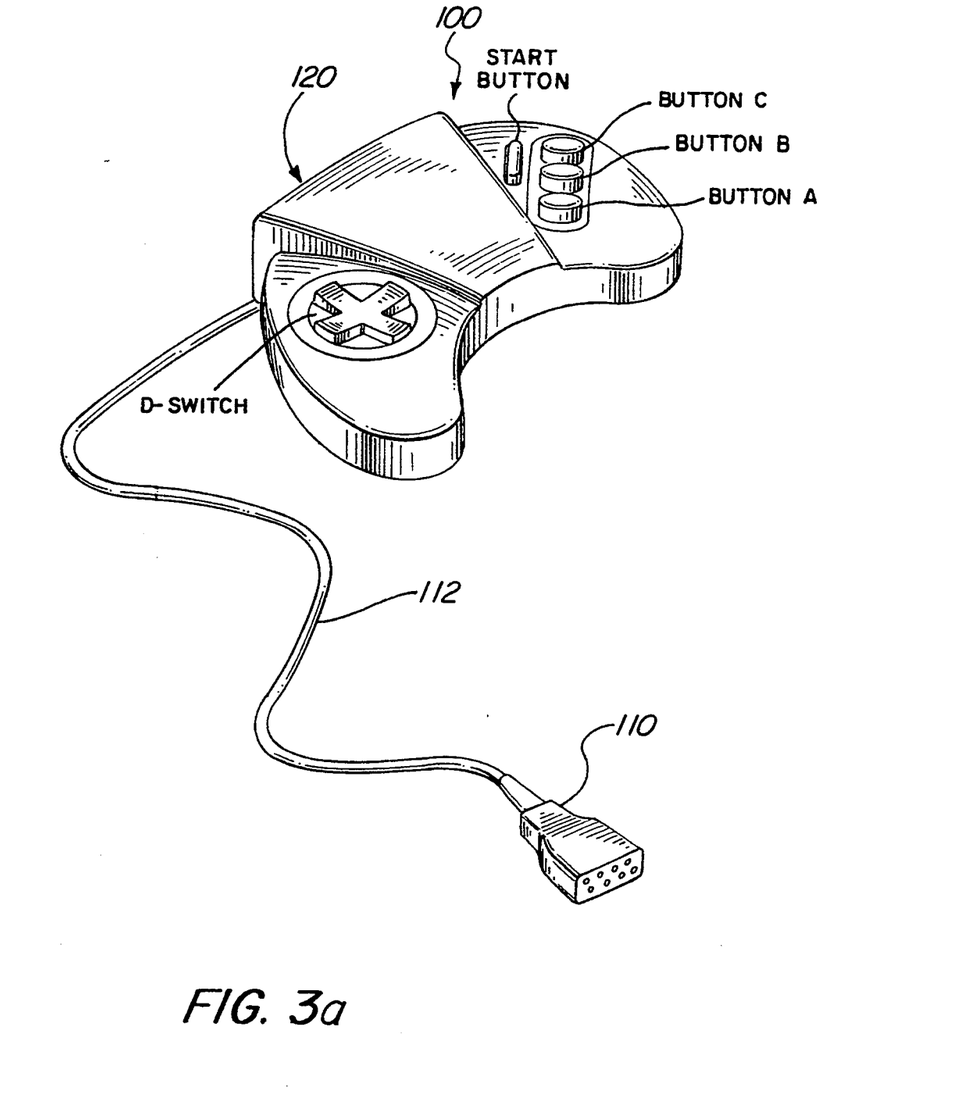
FIG. 3a is a perspective view of a preferred dual mode hand held controller 100 according to the present invention.
Figure 3B:
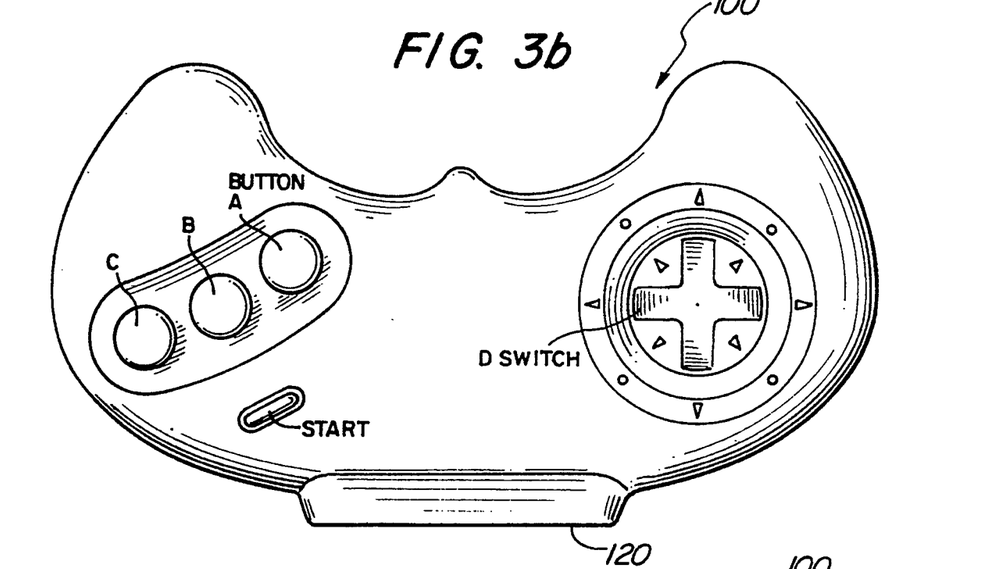
Figure 3C:
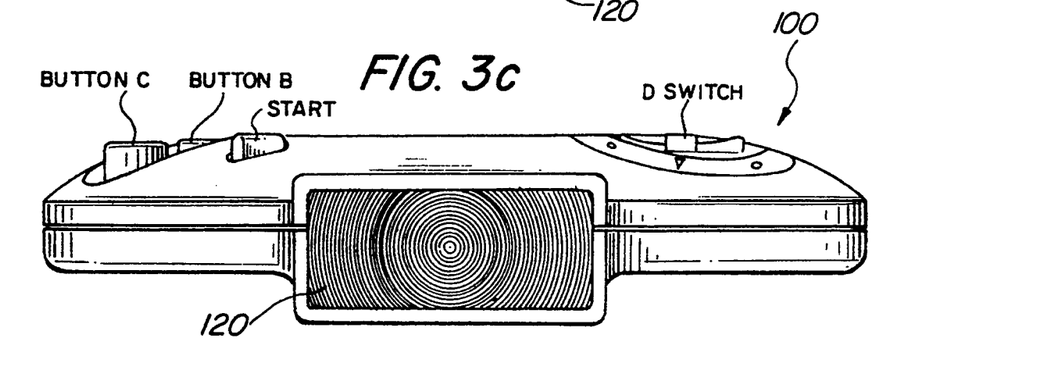
Figure 3D:
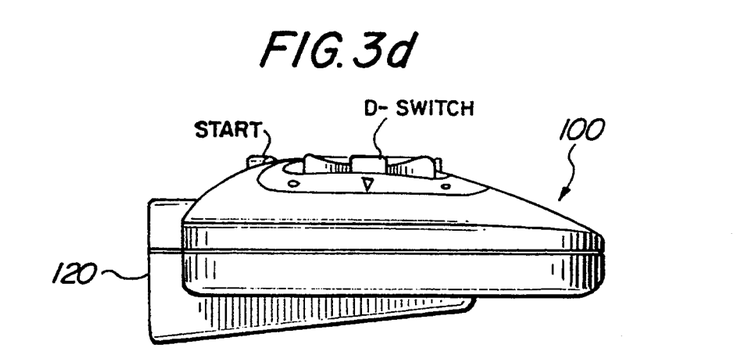

As shown by FIGS. 1 and 3a, the hand controller 100 is connected to an electronic plug input 12 or 13 on the gaming device 10 via a cable 112 and a 9-pin connector 110. From left to right, FIG. 5 generally depicts the 9-pin connector 110, the cable 112, the ASIC 200, an R/C network 210 comprised of a resistor 212 and a capacitor 214, a plurality of momentary contact switches (up, down, left, and right) which collectively comprise the D-Switch, the A, B, C, and Start buttons, and an optical sensor circuit 300. It is expected that future embodiments of the invention will incorporate even more control buttons.

Figure 7:
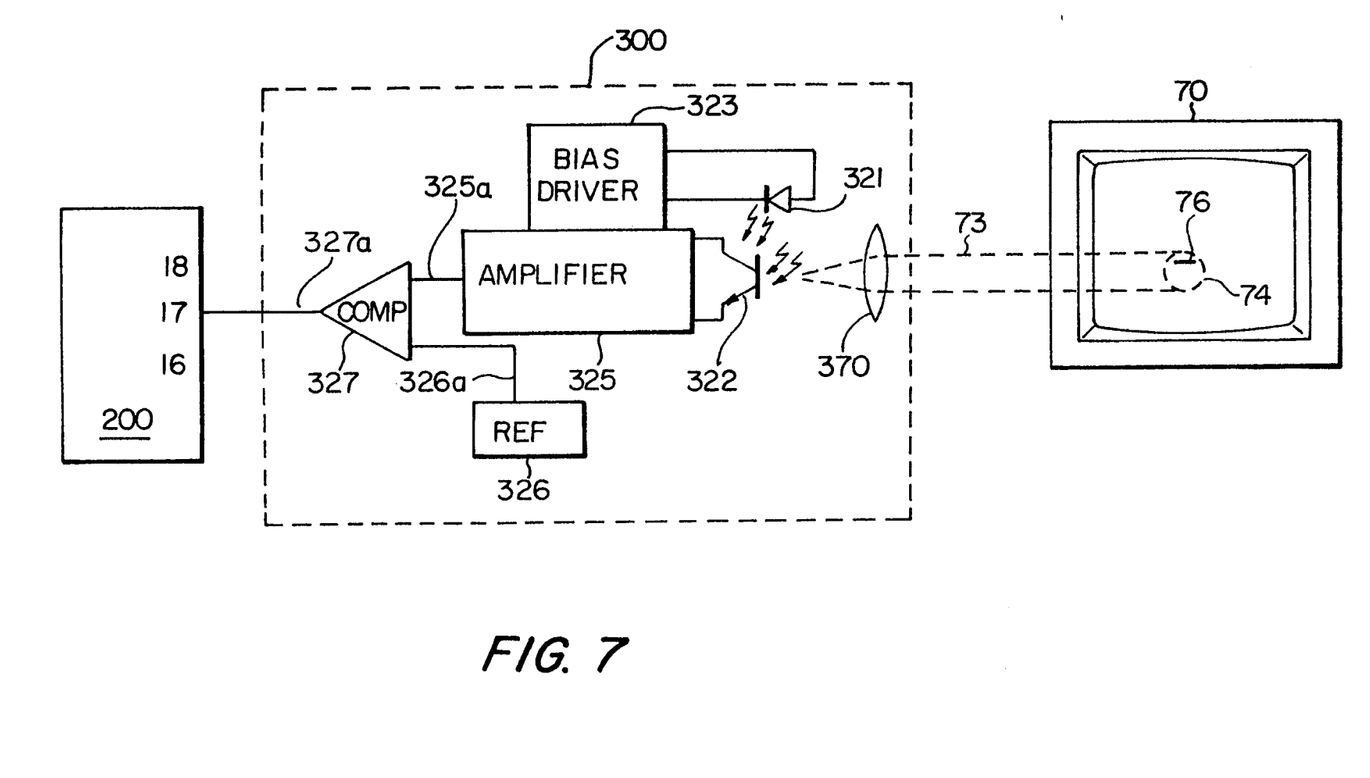
FIG. 7 is a functional block diagram corresponding to an optical sensor circuit 300 shown in FIG. 6.
Figure 8A:
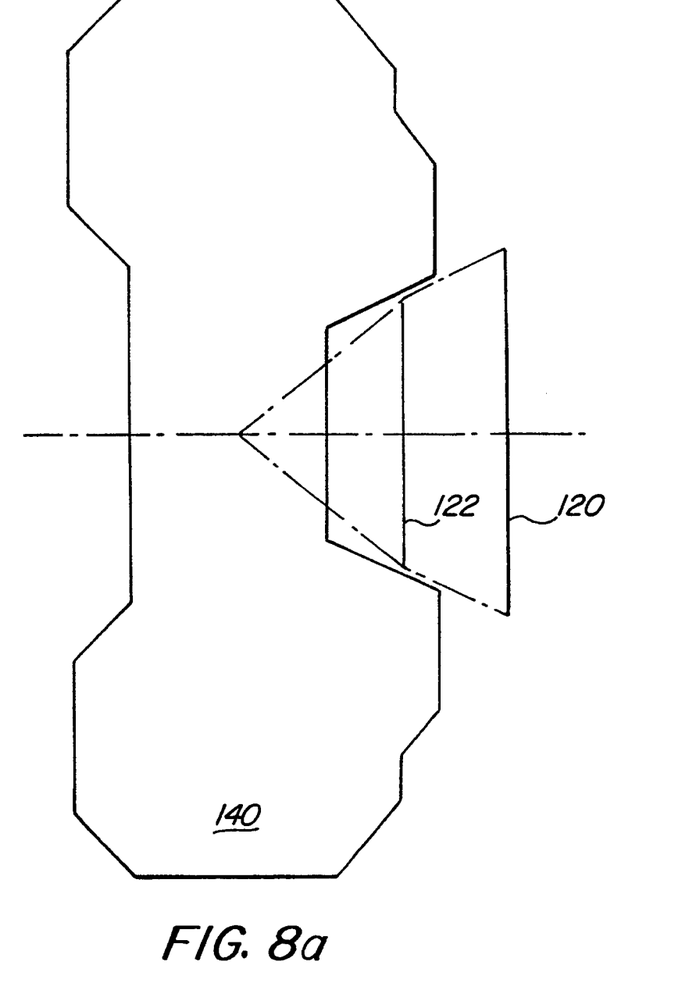
FIGS. 8a and 8b are respectively a top plan view and a side view of the relationship between the printed circuit board, the fresnel lenses, and the sensor (phototransistor 322) used with the dual mode controller 100 of the present invention.
Figure 8B:
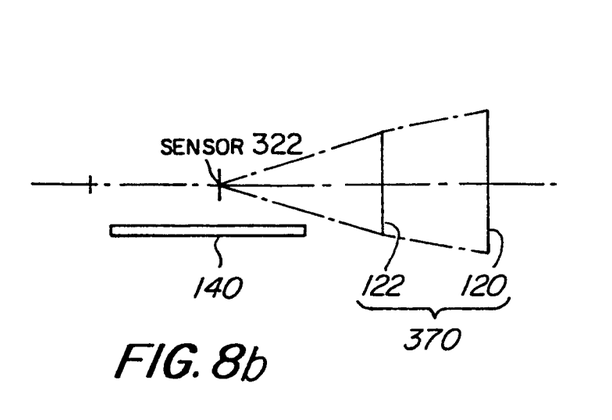
Figure 9A:
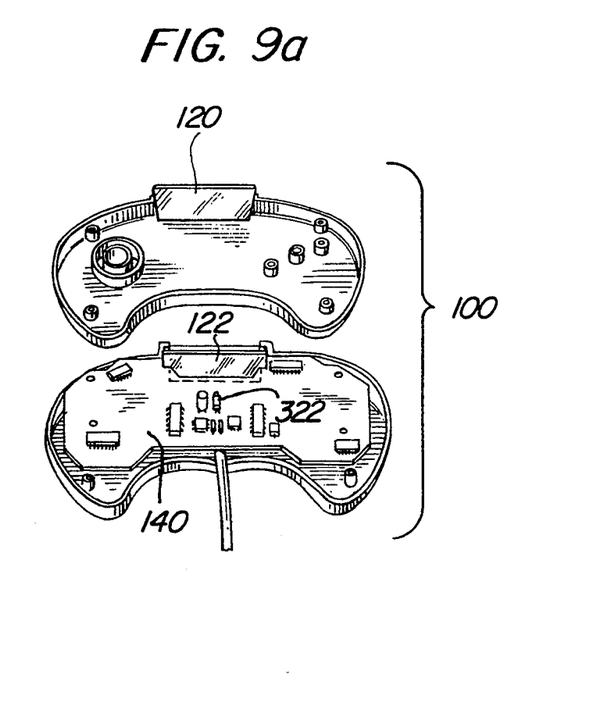
FIGS. 9a and 9b are top plan views of a two-piece housing structure for the preferred hand held controller 100, with a front fresnel lens mounted in one half of the housing and a rear fresnel lens mounted on the PC board.
Figure 9B:
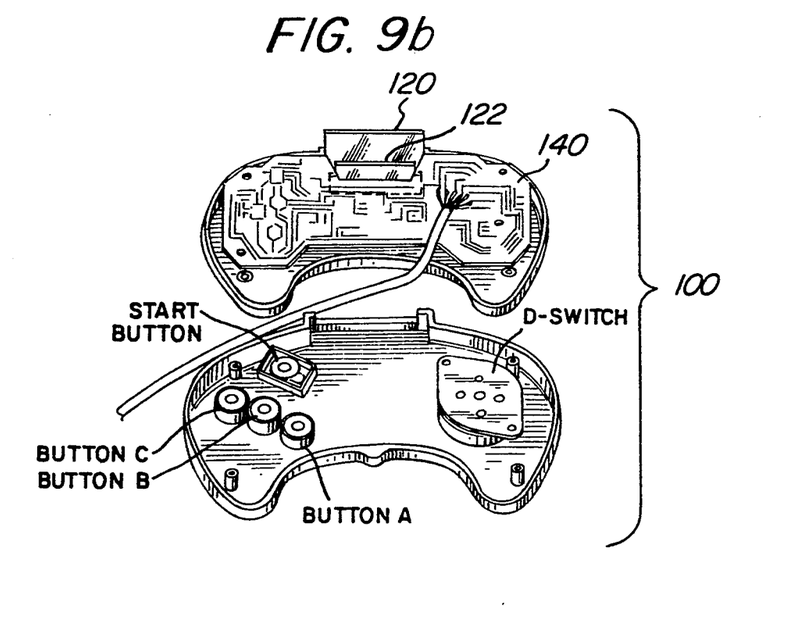

The optical sensor circuit 300 of FIG. 5, as suggested by the corresponding block diagram of FIG. 7, monitors image data 73 contained within a target area 74 of the television screen 70. The image data 73 is focused through a lens system 370 onto a phototransistor 322 which is sensitive to visible light. Thus, every time a horizontal scan line 76 passes through the target area 74, the phototransistor 322 generates a pulse which is amplified by an amplifier 325 and output as an amplified pulse signal 325a. A resistive divider circuit 326 generates a reference voltage which is provided as a reference signal 326a. A comparator 327 compares the amplified pulse signal 325a with the reference signal 326a and, whenever the former exceeds the latter, outputs a horizontal scan detection signal 327a to pin 17 of the ASIC 200.

The optical sensor circuit 300 features an optical biasing LED 321 which, in the preferred embodiment, is physically located immediately adjacent to the phototransistor 322. The gain of the phototransistor 322 is zero when there is no base drive. The gain generally increases as the base drive increases. The use of the optical biasing LED 321 allows for the two-legged phototransistor 322 instead of a standard three-legged phototransistor having an electrical base drive input. The latter device is undesirable because an attempt to increase gain may actually reduce gain. In particular, the resistive network used to electrically biasing the device may act as a low impedance shunt for any photocurrent generated by the device. It has been discovered that a sensitivity increase of 20:1 can be obtained with the optical biasing LED 321.

A bias driver 323 provides the necessary current to drive the optical biasing led 321 at a current which makes it sufficiently bright. At the present time, the preferred bias LED 321 is red in color and is driven at 10 mA. It is supposed that amber or orange LEDs may be preferred over red because of their generally higher quantum efficiencies.

The target area 74 encompasses about sixteen scan lines 76 when the preferred hand held controller 100 is held an average distance from an average sized television. The object is to detect the central most scan line which provides the longest and highest intensity pulse. Returning to the FIG. 6 logic diagram of the ASIC 200, we see that the horizontal scan detection signal 327a that is input at pin 17 drives the clock input CLK of a counter 210 which is configured as an up counter. For each horizontal scan line 76 that crosses the target area 74, the counter 210 counts up, with its outputs Q1, Q2, Q3, Q4 going successively from binary 0000 to binary 1111. Two inverters 211, 212 are driven by output Q4. When the count reaches decimal 8, i.e. when Q4 goes high to provide binary 1000, then the inverters 211, 212 go low. The output of inverter 211 is provided to the gaming device 10 over pin 5 as a scan line detection signal. As is well known in the art, the gaming device 10 can easily compute the screen location at which the detection occurred based on the time that it received the scan line detection signal relative to the beginning of the vertical retrace. The output of inverter 212 is provided to the clock input CLK, thereby freezing the counter 210 and stopping the count at 8 until the counter 210 receives a reset signal RST during the next vertical retrace.

During each vertical retrace of the television display 70, a conventional control pad 30 like that shown in FIG. 2 identifies itself as a hand controller and communicates button press data to the gaming device 10 over six ports P0-P5 (lines 1-4, 18, and 19). Because there are more than six pieces of data to be transmitted, a multiplexing scheme has been employed wherein the gaming device transmits a multiplex control signal to the conventional control pad 30 over port P6 (line 5). The picture becomes even more complicated given a dual mode controller 100 according to the present invention because now the gaming device must determine which type of controller is attached and the controller 100 must transmit scan line data in addition to button press data.

The present inventors have developed a novel circuitry which allows their dual mode controller 100 to act as either a standard controller 30 or as a dual mode controller 100 and which overcomes the need for additional lines. Thus, the dual mode controller 100 can operate in a "conventional" mode or in an "optical" mode. The ports P0, P1 (lines 18 and 19) are always outputs from the conventional controller 30 and the port P6 is always a multiplex control input to the conventional controller 30.

On the other hand, in the dual mode controller circuit of FIG. 6, the ports P0, P1, and P6 are bi-directional, serving as either data output ports (in conventional mode) or as command input ports (to place the controller in optical mode and thereafter provide control signals).

The ASIC 200 contains a multiplex logic block 240 as shown in FIG. 6. If the dual mode controller 100 is in the conventional mode, then the multiplex logic block 240 causes the controller to function as a conventional controller. On the other hand, if the dual mode controller 100 is in the optical mode, then the multiplex logic block 240 causes the controller to function as follows:

TABLE 1

| Dual Mode Controller | | | |
|---|---|---|---|
| Dual Mode Controller Port | Direction | P1-Line 18 | Function |
| P0 | Input | | Counter Reset |
| P1 | Input | | Data Select |
| P2 | Output | H | Left |
| P3 | Output | H | Right |
| P4 | Output | H | "B" Button |
| P5 | Output | H | "C" Button |
| P6 | Output | | Scan Line Data |
| P0 | Input | | Counter Reset |
| P1 | Input | | Data Select |
| P2 | Output | L | UP |
| P3 | Output | L | DOWN |
| P4 | Output | L | "A" Button |
| P5 | Output | L | "Start" Button |
| P6 | Output | | Scan Line Data |

A pair of pull-up resistors 220, 222 keep the ports P0, P1 nominally high. The ports P0, P1 of the dual mode controller 100 are connected to the inputs of a NOR gate 223. The dual mode controller 100 is placed in the optical mode by dropping and generally holding the ports P0, P1 low from the gaming device 10. We say "generally" low because the ports P0, P1 are periodically spiked high to reset the counter 210 during every vertical retrace (as described earlier) and to multiplex the button press data for eight buttons over 4 lines (see Table 1 above).

It is important to ensure that the relatively short high logic control signals applied to the ports P0, P1 from the gaming device not cause the dual mode controller 100 to inadvertently switch from the optical mode into the conventional mode. The ability for short duration high logic control spikes to be accommodated is accomplished with an R/C network as follows. When the ports P0, P1 are pulled low by the gaming device 10, the output of the NOR gate 223 goes high and is inverted low at pin 15 by an inverter 224. As shown in FIG. 5, pin 15 is connected to the top of an R/C network 210. The output of the R/C network, taken between the resistor 212 and the capacitor 214, is returned to the ASIC 200 and connected to a second input of the latch 230 at pin 16.

When the gaming device 10 pulls the ports P0, P1 low for a relatively long period of time to put the dual mode controller 100 into the optical mode, then the capacitor 214 will fully charge and the output of the inverter 224 will be diverted to pin 15 of the ASIC 200, thereby setting the latch 230. On the other hand, the relatively short button press output signals that periodically occur on ports P0 and P1 will not fully charge the capacitor 214 of the R/C network 210. Thus, the latch 230 will not be inadvertently reset by such short duration pulses.

The operational mode of the FIG. 6 circuity depends on whether or not the game cartridge is a "conventional" game or an "optical" game that can operate with a dual mode controller 100 according to the present invention. The software of an optical game will initially cause the gaming device 10 to determine which type of controller is connected (conventional 30 vs. dual mode 100) by dropping the ports P0, P1 low. The optical game software then determines whether or not the controller has gone into optical mode by checking the data at ports P2 P3, which, in the case of an conventional controller, would both be low. However, as reference to Table 1 above shows, a dual mode controller 100 has UP/DOWN attached to the ports P2, P3 when P1 is low. The UP and DOWN button cannot be pressed at the same time due to physical limitation associated with the D-Switch. Thus, given a dual mode controller, P2 and P3 cannot both be low (as with a conventional controller 30) and the game software will conclude that a dual mode controller 100 is attached. If both ports P2, P3 are low, the game software will conclude that a conventional controller 30 is attached.

While the above features of the present invention teach an apparatus for a dual-mode hand-held controller, it can be readily appreciated that it would be possible to deviate from the above embodiment without departing from the spirit of the invention. As will be readily understood by those skilled in the art of electronic games, the invention is capable of many modifications and improvements within the scope and spirit thereof. Accordingly, it will be understood that the invention is not to be limited by the specific embodiments but only by the following claims:

We claim:

1. A hand-held video game controller for a game on which a primary game object and a secondary game object are displayed, comprising:

a housing member which may be movably held by an operator in first and second hands with a front side of the housing member facing a display screen;

an optical input means on the front side of the housing member for detecting a particular pointed position on the display screen at which the operator is pointing the front side of the housing and for producing an optical position control signal, said control signal controlling the secondary game object lo based on the particular pointed position;

a manually operable direction input member for controlling the primary game object located on a top side and at a first end of the housing member to provide a manual direction control signal, said direction input member being positioned to be manually operable by a thumb of the first hand of the operator while the operator holds the housing member in the first hand;

means for allowing said optical input means and said direction input member to simultaneously control both the primary and secondary game objects; and a set of manually operable button controls on the top side and at a second end of the housing member to provide a manual button control signal, said button controls being positioned to be manually operable by a thumb of the second hand of the operator while the operator holds the housing member in the second hand, whereby the operator can individually use the thumbs of the first and second hands to respectively operate said direction input member and said button controls to respectively provide the manual direction control signal and the manual button control signal, while simultaneously using both hands to move the entire housing member relative to the display screen to provide the optical position control signal.

2. The hand-held video game controller of claim 1 wherein the optical position control signal of said optical input means controls a travel direction of the secondary game object.

3. The hand-held video game controller of claim 1 wherein the optical position control signal of said optical input means controls a selection of one of a plurality of possible secondary game objects.

4. The hand-held video game controller of claim 1 wherein the manually operable direction input member controls a travel direction of the primary game object.

* * * * *